United States Patent Office.

FERRAR FENTON, OF LONDON, ENGLAND.

PROCESS OF PRODUCING ARTIFICIAL GUTTA-PERCHA.

SPECIFICATION forming part of Letters Patent No. 599,694, dated March 1, 1898.

Application filed June 14, 1897. Serial No. 640,798. (No specimens.)

*To all whom it may concern:*

Be it known that I, FERRAR FENTON, a subject of the Queen of Great Britain, residing at London, in the county of Middlesex, England, have invented a certain new and useful Improved Process of Producing Artificial Gutta-Percha, &c., of which the following is a full and complete specification, such as will enable those skilled in the art to which it appertains to make and use the same.

This invention relates to an improvement in the art of manufacturing artificial gutta-percha and caoutchouc-like substances; and the object of the invention is to provide an improved process for this purpose by means of which the production of said articles may be simplified and rendered comparatively inexpensive.

The invention is fully disclosed in the following specification, and in the practice thereof I proceed in the following manner: I first take oxidizable vegetable oils capable of oxidation or thickening by the absorption of oxygen—by preference linseed, cotton-seed, hemp-seed, or nut oil—either in their raw state or already more or less oxidized by any usual means and mix or add to them tar, cresote, pitch, or other form of pyroligneous acid and place the mixture, either cold or previously heated, in a bath of diluted nitric acid and allow it to remain for maceration cold, or I may quicken the action by boiling until by action of the bath upon the compound the whole is coagulated into a tough elastic magma that does not adhere to a stick or agitator thrust into it or to the fingers when cold or hot, but has the appearance and nature of a caoutchouc-like substance, which forms the basis of the following more highly manufactured forms of the material produced; after boiling or macerating the above mixture in the nitric acid for a time less than is required for producing the perfect magma, but when it has absorbed a portion of acid, I pour the semi-magma into or upon hot pans or plates or cold pans or plates and roast it sharply for a short time, when it coagulates into a highly-elastic mass in appearance like natural india-rubber and can be vulcanized exactly as that substance is vulcanized and applied to the same uses. If black color is desired, I add to the roasting magma a small quantity of plumbago or black carbonate of iron and then take the perfectly-formed substance described and vulcanize it for various uses and for other purposes use it alone.

To produce an artificial gutta-percha, I take the oxidizable vegetable oils capable of oxidation or thickening by the absorption of oxygen—by preference linseed, cotton-seed, hemp-seed, or nut oil—either in the raw state or already more or less oxidized by any usual means and mix or add to them tar, creosote, pitch, or any other form of pyroligneous acid and place the mixture, either cold or previously heated, together in a bath of diluted nitric acid and allow it to remain for maceration cold, or I may quicken the action by boiling until by action of the bath upon the compound the whole is coagulated into a tough elastic magma, but does not adhere to a stick or agitator thrust into it or to the fingers, and when cold or hot it has the appearance and nature of a caoutchouc-like substance the same as hereinbefore described, and I add thereto shellac melted by heat or dissolved in spirits or other solvents or ground to a fine powder and add from one up to twenty per cent., or such proportions as may be necessary, of shellac to the oil and tars or pitches or pyroligneous acids and proceed, as hereinbefore described, by placing the mixture in a bath of diluted nitric acid and allow it to remain for maceration cold, or I may quicken the action by boiling until by action of the bath the whole is coagulated into a tough elastic magma, and if extra firmness and resistance to friction are desired I take the resulting magma, when perfectly boiled and in good measure cleared from the acid of the bath, and work into it by kneading or beating or rolling a part of quick or caustic lime, which produces the desired result. For most uses this artificial gutta-percha does not require the addition of lime. It can also be vulcanized, and I also apply these substances as electric and magnetic insulators to wires or cables and a protection against the percolation of water and for waterproofing fabrics, and owing to their cheapness they are of wide application in the arts.

In order to produce the above-named gutta-percha or caoutchouc like substances, I use varying proportions in the mixing of oils, tars, pitches, creosotes, or other forms of pyroligneous acids, according to the density or tenacity of purpose to which they are to be applied in use. The proportions of tars, pitches, creosotes, or other forms of pyroligneous acids may range from five per centum to seventy-five per cent. of the oils used by weight measure, the higher range of percentage being used in forming gutta-percha-like substances and the lower—say from five up to fifty—in producing the more elastic rubber-like forms of the article.

For the macerating or boiling bath of nitric acid I also use varying strengths, from a bath of nitric acid of the strength given in the *London Pharmacopœia* to various dilutions of that strength down to a percentage only of two and a half per cent. of that acid to ordinary tap, well, or distilled water. It is not necessary that the nitric acid should be free from iron or other substances with which the acid of commerce is frequently tinged. These above-described artificial products can be used by themselves in various arts and for different purposes, or they can be mixed up with or used in conjunction with natural caoutchouc, india-rubber, or gutta-percha.

Having fully described my invention, I claim and desire to secure by Letters Patent—

1. The herein-described process for manufacturing artificial gutta-percha, caoutchouc and like substances, said process consisting in taking an oxidizable vegetable oil either in the raw state, or more or less oxidized, and mixing therewith tar or other pyroligneous substances, and then placing the product in a bath of diluted nitric acid to form a magma or base, substantially as described.

2. The herein-described process for manufacturing artificial gutta-percha, caoutchouc and like substances, said process consisting in taking an oxidizable vegetable oil either in the raw state, or more or less oxidized, and mixing therewith tar or other pyroligneous substances, and then placing the product in a bath of diluted nitric acid to form a magma or base, and then roasting said magma or base, substantially as described.

In testimony that I claim the foregoing as my invention I have signed my name, in presence of the subscribing witnesses, this 2d day of June, 1897.

FERRAR FENTON.

Witnesses:
ALEX. RIDGWAY,
HUGH HUGHES.